April 7, 1970 D. EICHLER ET AL 3,504,657
SYSTEM FOR ENRICHING THE FUEL MIXTURE ON COLD STARTS
IN AN ELECTRICALLY CONTROLLED INJECTION SYSTEM
FOR AN INTERNAL COMBUSTION ENGINE
Filed May 16, 1968 2 Sheets-Sheet 1

INVENTORS:
Dieter EICHLER
Wolfgang REICHARDT
Hermann SCHOLL
Josef WAHL
Peter SCHMIDT BY Michael S. Striker their ATTORNEY April 7, 1970     D. EICHLER ET AL     3,504,657
SYSTEM FOR ENRICHING THE FUEL MIXTURE ON COLD STARTS
IN AN ELECTRICALLY CONTROLLED INJECTION SYSTEM
FOR AN INTERNAL COMBUSTION ENGINE
Filed May 16, 1968     2 Sheets-Sheet 2
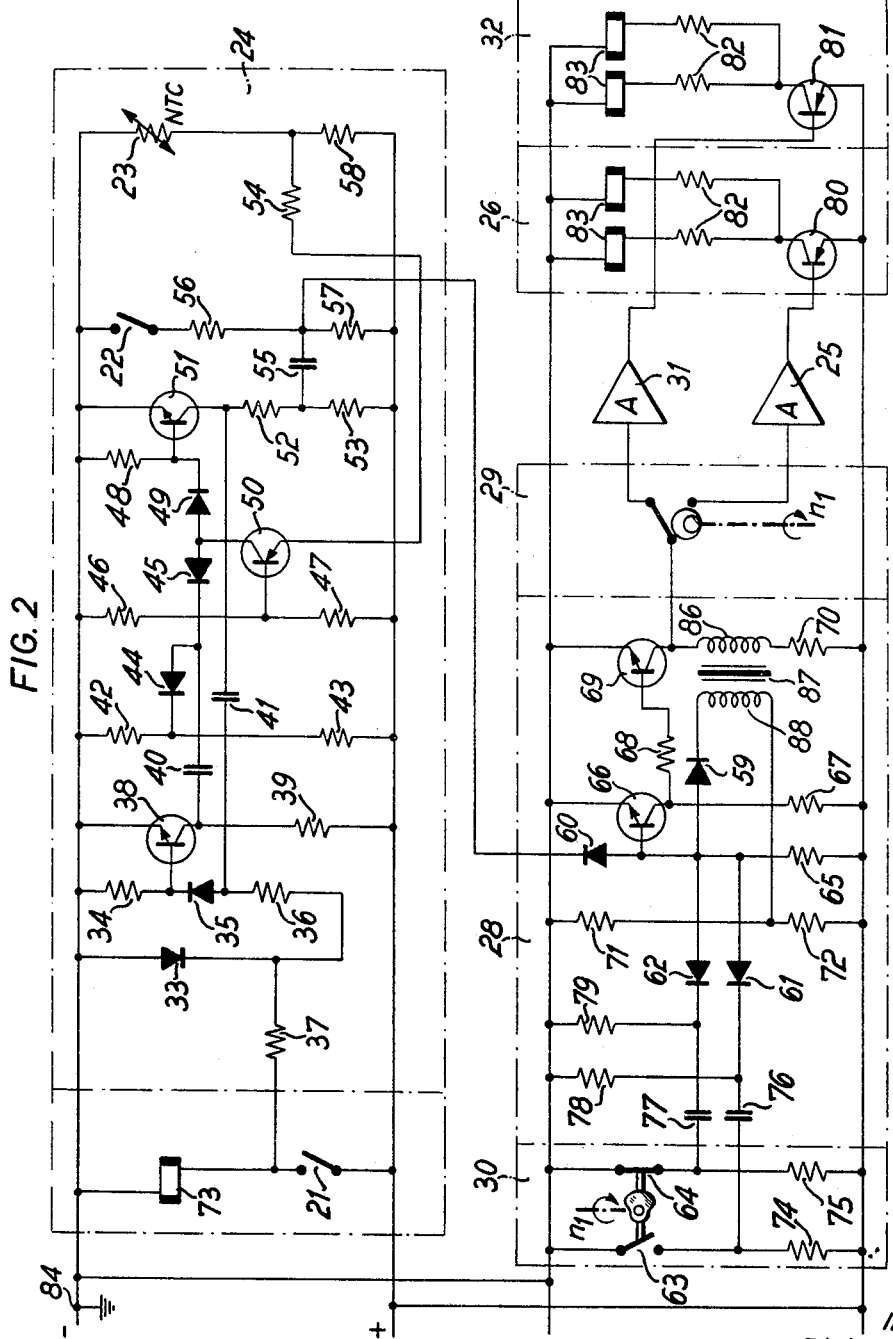
INVENTORS:
Dieter EICHLER
Wolfgang REICHARDT
Hermann SCHOLL
Josef WAHL
Peter SCHMIDT
BY Michael S. Striker
their ATTORNEY

United States Patent Office 3,504,657
Patented Apr. 7, 1970

3,504,657
SYSTEM FOR ENRICHING THE FUEL MIXTURE ON COLD STARTS IN AN ELECTRICALLY CONTROLLED INJECTION SYSTEM FOR AN INTERNAL COMBUSTION ENGINE
Dieter Eichler, Bonlanden, Wolfgang Reichardt, Stuttgart-Rohr, Peter Schmidt, Stuttgart-Botnang, Hermann Scholl, Stuttgart, and Josef Wahl, Stuttgart-Kaltental, Germany, assignors to Robert Bosch GmbH, Stuttgart-Germany
Filed May 16, 1968, Ser. No. 729,673
Claims priority, application Germany, May 24, 1967,
B 92,696
Int. Cl. F02m 13/00
U.S. Cl. 123—32                 14 Claims

ABSTRACT OF THE DISCLOSURE

Control signals are generated in synchronism with the rotation of the shaft of an engine. These control signals with a monostable multivibrator into the unstable state, in which it remains for duration of time depending on at least one operating parameter of the engine. An electromagnetically controlled fuel injector injects fuel during the time the multivibrator is in the unstable state. For a cold start, an astable multivibrator furnishes an additional control signal to the monostable multivibrator between successive synchronized control signals, thus causing additional fuel to be injected during each operation cycle.

BACKGROUND OF THE INVENTION

This invention relates to a system for increasing the amount of fuel injected into an internal combustion engine during a cold start. In particular, it relates to electronically controlled injection systems, in which an electromagnetically controlled injection means injects fuel into the engine for a duration of time depending on an activation pulse. The activation pulse in turn is supplied by monostable circuit means, which in turn are controlled by first control pulses generated in synchronism with the rotation of the shaft of the engine.

The fuel-air mixture must be enriched for cold starting, because a part of the fuel condenses on the cold walls of the intake manifold and only a part of the fuel evaporates and becomes available for operation of the engine. Circuit arrangements are already known in which the injection time is increased during a cold start. In one such arrangement, two independent electrical control systems are used, in which one controls the amount of fuel in dependence on the required power, while the other controls an additive component in dependence on the temperature of the engine. The second, additive, component is considerably increased for a cold start. Experiments have shown, that this additive component must be greatly dependent upon the rotational speed of the engine, since with the first ignition of the engine, the speed of rotation increases and the fuel mixture improves as a result thereof. Therefore the additive fuel injection must decrease with increasing rotational speed so that the fuel-air mixture is always ignitable and yields a high combustion energy. If this is not the case, a drop in speed will result because of a failure to ignite or a low energy ignition.

SUMMARY OF THE INVENTION

It is an object of this invention to furnish a system for enriching the fuel mixture in a cold start in dependence on the speed of rotation of the engine.

The invention comprises a system for enriching the fuel mixture for cold starts of an engine having a shaft. It comprises means for generating first control signals in synchronism with the rotation of said shaft, as well as monostable circuit means for generating activation pulses in response to said first control signals. Also furnished are at least one electromagnetically controlled fuel injection mechanism adapted to inject fuel for a duration of time depending upon the duration of said activation pulse. The system further comprises astable circuit means adapted to furnish at least one additional control signal to said monostable circuit means between successive first control signals, during said cold starts, thus causing additional fuel to be injected during each operating cycle of said engine.

Since the frequency of said astable multivibrator is independent of the rotational speed of the motor increases in motor speed result in fewer additional control pulses being furnished to said monostable circuit means, and thus in a decrease of the fuel injected with increasing motor speed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a detailed circuit diagram of the arrangement shown in FIG. 1.

DESCRIPTION OF THE PREFERRED EMBODIMENTS

Figure 1:
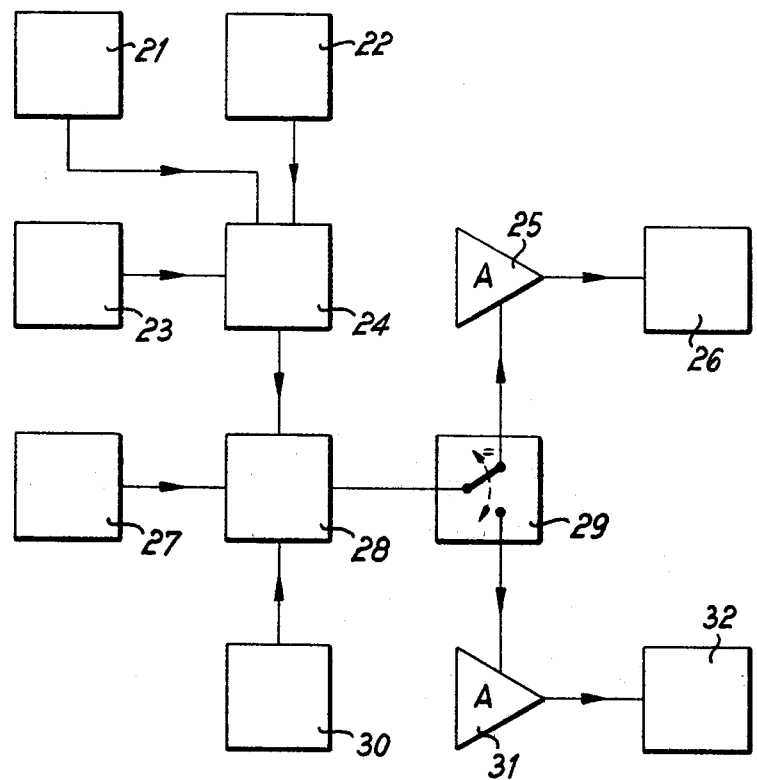
FIG. 1 is a block diagram of a system according to this invention.

FIG. 1 is a block diagram of one embodiment of the present invention. As shown in this figure, the injection arrangement may be a two-channel injection system for a four-cylinder internal combustion engine operating with controlled ignition. The injection system comprises an electronic control system for determining the injection time of fuel injectors which are adapted to remain open while current flows through an activation coil of said injectors. Fuel is fed to the injectors under constant pressure, for example two times atmospheric pressure. The amount of fuel injected per injection thus depends on the length of time that the injector is activated. The circuitry determining the length of injection time is a monostable multivibrator 28. Under normal operation, this monostable multivibrator is switched to the unstable state by first control signal generating means, 30, which generate a first control signal in synchronism with the rotation of the cam shaft of the engine. The time the monostable multivibrator remains in the unstable state may, for example, be varied as a function of the pressure in the intake manifold of the engine. For this purpose, a pressure sensor, 27, is supplied. This may be embodied in a transformer having a movable ion core whose position depends on the pressure in the intake manifold and changes in whose position cause changes in the inductivity of the transformer which in turn cause variations in the period of the monostable multivibrator. The activation pulses generated at the output of the monostable circuit means, or here the monostable multivibrator, are connected alternately over amplifiers 25 and 31, respectively, to output stages 26 and 32, respectively, to each of which two injectors are connected which inject fuel during the time duration of the activation pulse. The switching to amplifiers 25 and 31 in turn is accomplished by an electronic switch 29. For cold starts, astable circuit means, here embodied in astable multivibrator 24 furnish additional control pulses to monostable multivibrator 28. These additional control pulses, may, for example, cause several additional control pulses to be furnished to the monostable multivibrator for each rotation of the cam shaft, thus causing corresponding additional injections to take place. The circuit arrangement for the astable multivibrator 24 is such that it oscillates only when starter switch 21 is closed and when, in addition, the temperature of the engine which is sensed by temperature sensor 23 is considerably below the engine temperature under normal operation. Furthermore, the oscillation frequency of the astable multivibrator is made temperature dependent in such a manner that the period of the oscillations increases with increasing temperature and therefore causes fewer additional control pulses to be furnished to the monostable multivibrator per engine rotation. When a predetermined temperature, for example 15° C. is reached, the astable multivibrator ceases oscillating.

Experimentation has shown that it is advantageous to stop the enrichment of the fuel mixture entirely upon attainment of a certain engine speed. This is done in the following manner:

On starting, this is for a closed throttle valve, the pressure in the intake manifold varies considerably with the speed of rotation of the engine. A pressure switch 22 is therefore connected to this pipe. This is a normally closed switch and opens when the pressure attains a predetermined value, that is for a particular speed of rotation of the engine. Only when the pressure switch is closed does the astable multivibrator generate the additional control pulses for activating the monostable multivibrator.

The complete circuit diagram is shown in FIG. 2. The two transistors 66 and 69 together constitute the monostable multivibrator 28, which generate the activation pulses which determine the length of time the injection takes place. The time period for which the monostable multivibrator remains in the unstable state is determined at least in part by the inductivity of the primary winding 86 of a transformer, which in turn is varied by movement of the iron core 87 as a function of the pressure in the inlet manifold of the combustion engine. In the quiescent or stable state transistor 66 conducts and transistor 69 is blocked, since the base of transistor 66 is at a positive potential relative to the emitter because of its connection to the positive supply line by means of resistors 65. If a first control signal is now generated by means of either first control signal generating means 63 or 64, and differentiated by, respectively, the differentiating circuit consisting of capacitors 76 and resistor 78, or the differentiating circuit consisting of capacitor 77 and resistor 79, then the first control signal is applied to the base of transistor 66 by diode 61 or 62, causing the transistor to block. Simultaneously, transistor 69 becomes conductive and begins to drive current through the primary winding of transformer 86 which is situated in its collector circuit. This current quickly reaches its maximum value which is determined by the magnitude of the winding resistance and that of resistor 70. During this current buildup, an exponentially decreasing voltage is generated in the secondary winding 88, whose time constant depends on the position of the iron core 87. This negative voltage causes transistor 66 to remain blocked until its base again becomes positive relative to the emitter. Then transistor 66 again becomes conductive and simultaneously blocks transistor 69. In this way pulses are generated at the collector of transistor 69 whose width depends on the pressure in the intake manifold. Of course, it is possible, if desirable for the operation of the engine that the pulse width, or time duration is made dependent upon other operating parameters of the engine as well. These operating parameters may for example be the engine temperature, the battery voltage, or the speed of rotation of the engine.

An electronics switch 29 alternately furnishes the above-described activation pulses to the amplifiers 25 and 31 respectively and through these amplifiers to the output transistors 80 and 81 respectively. Two injectors 83, each with a series resistor 82, are connected in parallel to the collector of each of the transistors 80 and 81. As long as one of these transistors is conductive, the corresponding injectors receive an activation current and fuel is injected.

Astable circuit means, here astable multivibrator 24, consists of transistors 38, 50 and 51. As long as switch 21 which serves to activate the starter which is not shown, is open, transistor 38 remains blocked. The state of transistors 51 depends upon the operating temperature of the engine. Resistor 23, in thermal contact with the engine, is a negative temperature coefficient resistor and serves as a means for changing the frequency of the astable multivibrator as a function of engine temperature. It is connected to the negative supply line 84 (which is connected to the negative pole of the engine battery which is not shown). It is also connected to the positive supply line by means of resistor 58. Resistors 23 and 58, in conjunction with resistors 46 and 47 which are also connected in series from the negative to the positive supply line, form a bridge circuit. The base of transistor 50 is connected to the common point of resistors 46 and 47, and is thus approximately half the battery voltage, since resistors 46 and 47 are equal. The emitter of transistor 50 is connected to the common point of resistors 23 and 58 by means of resistor 54. The emitter-base circuit of the transistor thus forms the diagonal arm of the bridge. Transistor 51 has base current only when the emitter-collector circuit of transistor 50 is conductive, since diode 45 serves to block any other possible current source.

Transistor 50 can only become conductive, when its emitter is positive with respect to its base. Thus the voltage at the common point of resistors 23 and 58 must be relatively high. This is the case for low temperatures, when the negative temperature coefficient resistor 23 has a high resistance. If starter switch 21 is closed base current can flow to transistor 38 by means of resistors 37 and 36 and diode 35. This will then become conductive. Diode 35, as well as diode 49, serve to protect the base-emitter circuit of transistors 38 and 51 respectively from overvoltages. They are required, since the opening of switch 21 can cause negative voltages reaching a peak of 400 volts to appear across the winding of magnetic switch 73. These are applied to the base of transistor 38 by means of resistors 37 and 36, and by means of diode 35 whose reverse breakdown voltage is considerably lower than 400 volts. Since these voltages could destroy transistor 38, a diode 33 is connected between the common point of resistors 37 and 36 and the negative supply voltage line. The anode of the diode 33 is connected to the negative supply voltage line, while the cathode is connected to the common point of resistors 37 and 36. While under normal operation diode 33 is blocked, the appearance of one of these high switching voltages causes it to become conductive and to limit the voltage transmitted to the base to the negative supply voltage. Resistor 37 must be so chosen that the maximum current rating of diode 33 is not exceeded.

When transistor 38 becomes conductive because of the activation of the starter, its collector voltage changes abruptly to substantially the negative supply voltage. This voltage step is transmitted to the collector of transistor 50 by condensor 40 and diode 45. Since the anode of diode 49 is connected to the collector of transistor 50 this diode blocks, so that no base current flows to transistor 51. Thus transistor 51 blocks. This negative voltage step is now dissipated over the collector-emitter circuit of transistor 50 and resistance 54 at a constant current. The time instant at which transistor 51 again becomes conductive depends upon the voltage at the common point of the negative temperature coefficient resistor 23 and resistor 58 and is thus dependent on the operating temperature of the engine. With increasing temperature the voltage at resistor 54 will become smaller as does the current through this resistor. This increases the time during which the negative potential is dissipated. When transistor 51 again becomes conductive, the voltage at its collector undergoes an abrupt negative change by an amount substantially equal to the emitter voltage. This voltage step is applied to the anode of diode 35 via capacitor 41. This diode blocks, thus blocking transistor 38. The negative voltage step is dissipated over resistors 36 and 37 until transistor 38 again becomes conductive and the whole process repeats, thus generating a new oscillation of the astable multivibrator.

Diodes 44 and 45 have the following function: if the engine was started at low temperatures, then transistor 38 is blocked after the starter process has ended. As long as the engine operating temperature, as sensed by resistor 23 is low, transistor 50 remains conductive. When this temperature rises, transistor 50, and thus transistor 51 become blocked. Then the voltage at the collector of transistor 51 undergoes a sudden step in the positive direction of an amplitude equal to the battery voltage, causing transistor 38 to become conductive for a short while via condenser 41. In order to keep transistor 51 from becoming conductive when transistor 38 blocks, and thus causing the astable multivibrator to oscillate, diode 45 in connected between the right side of capacitor 40 and the anode of diode 49 in such a manner that it blocks positive voltage steps. Diode 45 is biased by means of diode 44, which prevents a discharge of capacitor 40 over the voltage divider consisting of resistors 42 and 43.

The cathode of diode 44 must be biased, so that diodes 44 and 45 block in the quiescent condition, that is to prevent the flow of leakage current which might prevent transistor 51 from remaining conductive.

If transistor 51 becomes conductive, the potential at its collector, as described above abruptly changes negatively by an amount equal to the battery voltage. This voltage step is divided by a voltage divider consisting of resistors 52 and 53 and applied to a voltage divider consisting of resistors 56 and 57 by means of capacitor 55. The cathode of diode 60 is also connected to this voltage divider, while its anode is connected to the base of transistor 66. Diode 60 is normally blocked. When pressure switch 22 opens, the right side of capacitor 55 is substantially at the positive potential of the battery. Since the anode of diode 60 is substantially at the negative battery potential, the negative voltage step is insufficient to cause diode 60 to become conductive. Thus astable multivibrator 24 cannot supply additional control pulses leading to an enrichment of the mixture when pressure switch 22 is opened. Only if pressure switch 22 is closed does the electrode of capacitor 55 which is connected to resistors 56 and 57 have a sufficiently negative potential that the negative voltage step is sufficient to cause diode 60 to become conductive. This causes the base of transistor 66 to become negative relative to its emitter, thus causing monostable multivibrator 28 to be switched to its unstable state, thus causing additional fuel to be injected.

It is an advantage of the above-described arrangement, that astable multivibrator 28 only oscillates when starter switch 21 is closed and when the engine temperatures are low. If the temperature of the engine increases, the frequency of the astable multivibrator decreases or, in other words, its period becomes greater, until, upon reaching a predetermined temperature, the oscillations cease entirely. This threshold may be varied within a wide range by changing resistors 46 and 47. However, additional control pulses will be applied to the monostable multivibrator by means of the astable multivibrator, only when pressure switch 22 is closed.

While the invention has been illustrated and described as embodied in an arrangement for enriching the fuel mixture during a cold start of a four-cylinder engine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. A system for enriching the fuel mixture for cold starts of an engine having a shaft, comprising, in combination, means for generating first control signals in synchronism with the rotation of said shaft; monostable circuit means for generating activation pulses in response to said first control signals; at least one electromagnetically controlled fuel injection mechanism for injecting fuel for a time duration depending on the duration of said activation pulses; astable circuit means having a frequency dependent on engine temperature but independent of the rotational speed of said engine and adapted to furnish at least one additional control signal to said monostable circuit means between successive first control signals during said cold starts, thus causing additional fuel to be injected during each operating cycle of said engine.

2. A system as set forth in claim 1 wherein said monostable circuit means comprise a monostable multivibrator.

3. A system as set forth in claim 2 wherein said astable circuit means comprise an astable multivibrator.

4. A system as set forth in claim 3 also comprising means for changing the frequency of said astable multivibrator in dependence on at least one operating parameter of said engine.

5. A system as set forth in claim 4 wherein said operating parameter is the temperature of the engine.

6. A system as set forth in claim 5, also comprising means for terminating the operation of said astable multivibrator upon attainment of a predetermined pressure in the intake manifold of the engine.

7. A system as set forth in claim 5, wherein said means of varying the frequency of said astable multivbrator in dependence on the temperature of said engine comprise a temperature dependent resistance means, in thermal contact with said engine.

8. A system as set forth in claim 1, wherein said astable multivibrator comprises at least one electric storage means for determining, at least in part, the frequency of said astable multivibrators; also comprising switching means adapted to be in an operative or non-operative state in dependence on the pressure in the intake manifold of said engine; and means for changing the energy stored in said frequency determining storage means when said switching means are in said operative state.

9. A system as set forth in claim 8, wherein said storage means comprise a capacitor.

10. A system as set forth in claim 9, wherein said capacitor comprises a capacitor connected between astable multivibrator and the input to said monostable multivibrator.

11. A system as set forth in claim 3, wherein said engine has a starter; also comprising means for starting the oscillations of said astable multivibrator substantially simultaneously with the activation of said starter.

12. A system as set forth in claim 7, wherein astable multivibrator comprises a bridge circuit, having a negative temperature coefficient resistance in one arm; a first transistor, having an emitter-base circuit connected in such a manner that it comprises the diagonal arm of said bridge circuit, and a collector; and a second transistor, of opposite conductivity type to said first transistor, and having a base and a collector; rectifier means connecting the base of said second transistor to the collector of said first transistor, in such a direction as to permit current to flow in said first collector; and means for connecting the collector of said second transistor to the input of said monostable multivibrator.

13. A system as set forth in claim 12, wherein said engine has a starter; also comprising an input stage for said astable multivibrator having a switch operating simultaneously with the activation of said starter; a third transistor of opposite conductivity type as said first transistor, having a base and a collector; a second capacitor connecting the collector of said third transistor to the collector of said first transistor; a diode connected to the base of said third transistor; a third capacitor having a first terminal connected to the other terminal of said diode and a second terminal connected to the collector of said second transistor; and at least one resistor connected from said first terminal of said third capacitor to said switch.

14. A system as set forth in claim 13, wherein power is supplied to said astable multivibrator on a first and second electrical supply line; also comprising a voltage divider connected from said first to said second electrical supply line; an additional diode connected between the collector of said first transistor and said second capacitor; and a third diode connected between said additional diode and a tap on said voltage divider in such a manner that the two diodes form a series connection of identical polarity between said collector of said first transistor and said voltage divider tap.

References Cited

UNITED STATES PATENTS

| | | | |
|---|---|---|---|
| 2,815,009 | 12/1957 | Pribble | 123—32 |
| 3,240,191 | 3/1966 | Wallis | 123—32 |

LAURENCE M. GOODRIDGE, Primary Examiner

U.S. Cl. X.R.

123—119, 179